(12) United States Patent
Madden et al.

(10) Patent No.: US 8,210,499 B2
(45) Date of Patent: Jul. 3, 2012

(54) AUTOMATED BALL VALVE AND ACTUATOR

(75) Inventors: Kenneth Madden, Candia, NH (US);
Daniel Harris, Deerfield, NH (US)

(73) Assignee: Gemini Valve, Raymond, NH (US)

( * ) Notice: Subject to any disclaimer, the term of this patent is extended or adjusted under 35 U.S.C. 154(b) by 962 days.

(21) Appl. No.: 12/146,666

(22) Filed: Jun. 26, 2008

(65) Prior Publication Data
US 2009/0321674 A1    Dec. 31, 2009

(51) Int. Cl.
*F16K 5/00* (2006.01)
(52) U.S. Cl. .................................. 251/315.01; 251/315.1
(58) Field of Classification Search ............. 251/315.01, 251/315.17, 315.18, 315.19, 315.07, 315.08, 251/315.09, 315.1; 403/362, 375
See application file for complete search history.

(56) References Cited

U.S. PATENT DOCUMENTS

| 5,178,361 | A | 1/1993 | Gilbert et al. |
| 5,267,722 | A * | 12/1993 | Coulter ..................... 251/315.01 |
| 7,025,330 | B2 | 4/2006 | Massey |
| 7,516,941 | B2 * | 4/2009 | Combs ...................... 251/315.01 |
| 2005/0104026 | A1 * | 5/2005 | Tulaskar .................. 251/315.01 |

* cited by examiner

*Primary Examiner* — Steven J Ganey
(74) *Attorney, Agent, or Firm* — Daniels Patent Law PLLC; Scott A. Daniels

(57) ABSTRACT

A ball valve and ball valve actuator including a unique valve stem seal and mounting connection between the ball valve and actuator. The stem seal design reduces leakage issues and significantly lengthens the life span of the ball valve and actuator and the mounting connection between the actuator. The ball valve maintains the centrality of the valve stem in connection with the actuator pinion and minimizes torque and shear forces transferred to the valve stem and hence the stem seal itself.

20 Claims, 11 Drawing Sheets

AUTOMATED BALL VALVE AND ACTUATOR

FIELD OF THE INVENTION

The present invention relates to a ball valve and ball valve actuator and more specifically to a unique valve stem seal and mounting connection between the ball valve and actuator. The stem seal design reduces leakage issues and significantly lengthens the life span of the ball valve and actuator and the mounting connection between the actuator. The ball valve maintains the centrality of the valve stem in connection with the actuator pinion and minimizes torque and shear forces transferred to the valve stem and hence the stem seal itself permitting use of smaller electric actuators then known conventionally to operate the ball valve.

BACKGROUND OF THE INVENTION

Many industrial processes include liquid, semi-liquid and gas distribution systems which require automation of ball valves in the distribution pipelines of the industrial processes. Examples of such processes are food processing, chemical manufacturing and PET blow molding operations. In such processes very specific quantities of liquid product must be delivered, combined, dispensed and/or regulated in some manner by the automated ball valves so as to produce a desired final product or application. In many instances the ball valves are controlled or actuated for example by pneumatic actuators, which in turn are controlled via a computer system which controls and monitors the industrial process or application.

The actuators open, close and in general operate the ball valves to regulate the flow of product in any manner as directed by the computer system. There are many commercially available actuator systems to open and close ball valves including for example pneumatic double acting load cylinders with a rack and spur gear operating the valve stem of an attached ball valve. In such a pneumatic system, air pressure is controlled by a solenoid valve that drives the load cylinder which moves the rack and turns the spur gear which in turn rotates to the stem of the ball valve. This known arrangement allows the valve to be opened or closed in response to directed air pressure pulses.

Industry standards exist for the mounting and connection of such actuators to known ball valve designs. These standards ensure that there is some consistency across the industry, however the standards do not optimize the manufacturing and operating characteristics necessary to produce ball valves and actuators with a long lifespan. Even under the industry standards a ball valve and actuator combination may be merely a manual ball valve which has the handle removed and is bolted to the actuator so that the valve stem is fitted into a pinion in the actuator which turns the valve stem and hence the ball in the valve.

Ball valves are generally provided with a valve bonnet which houses the valve stem and is usually an integral part of the valve body. The valve bonnet extends perpendicularly upwards relative to the flow passage through the valve, and has a flange which, under the industry standards, is provided with four (4) bolt holes by which the flange is connected to the bottom of the actuator housing. The industry standards require four vertical bolts, one bolt at each corner of the flange on the bonnet which connect into threaded holes in the bottom of the actuator housing. These bolts are generally aligned in parallel with the valve stem and are subject to a significant amount of reaction torque and shear stress that occurs between the actuator and valve from internal seals and packings as well as the additive effects of forces created by fluid dynamics acting on the ball valve. Also, the axial length of the bonnet and the valve stem of the known ball valves defines a substantial distance between the actuator and the ball valve which can accentuate the torque and shear forces and so apply tremendous stress on these bolts over time.

Even before failure, any loosening of the standard valve and actuator connection due to such torque and shear forces causes misalignment between the valve stem and the rotation axis of the actuator. At the very least such a loss of centrality, or axial misalignment between the rotation axis of the valve stem and that of the actuator can place significant pressure and force on the valve seal accelerating wear and causing external leaks. In the worst case scenario, the valve stem seals can fail altogether and/or the valve body separates from the actuator. These conventional type of connections between the valve body and the actuator can survive only a certain number of cycles before failure or maintenance which of course affects not only the efficiencies and costs relating to the ball valve and actuator but which shuts down the entire process in which these devices are used.

OBJECTS AND SUMMARY OF THE INVENTION

The present invention obviates the short comings and disadvantages of the described prior structures and arrangements. In particular, one aspect of the present invention is directed to an improved valve stem seal which significantly increases the ability of the stem seal to resist leakage over its lifetime and the number of cycles applied to the valve by the actuator.

Another aspect of the invention provides a secure and integral connection between the ball valve body and the actuator body so that the torque and shear forces applied between the actuator and the ball valve body during operation do not allow for relative motion between the two elements and thereby prevent misalignment of the stem shaft with the actuator pinion that would otherwise compromise the stem seal.

It is a still further object of the present invention to provide a cost-efficient bar stock ball valve provided with an integral mounting track for connecting to a mounting pad of the actuator.

It is yet another object of the present invention to provide a maintenance free ball valve stem seal that does not use a threaded packing nut that can come loose or fail during the course of the operative lifetime and a high number of cycles of the ball valve. By eliminating the threaded packing nut there is no chance or risk of improper manual adjustment either during assembly, installation or maintenance.

It is another still further object of the present invention to significantly reduce the shear and torque forces between the actuator and ball valve body which correspondingly loosen the connection therebetween and compromise the integrity of the connection between the actuator and the ball valve stem and thus the accurate actuation of the ball valve by the actuator.

The present invention utilizes a compression spring in combination with an external O-ring to reduce the amount of friction wear as well as to compensate for any wear of the external O-ring resulting from cycling of the ball valve. Also, the present invention includes a precise, dimensionally controlled mounting device for ensuring that the ball valve body is accurately and securely affixed to the actuator body in a manner which reduces the torque and sheer forces between these two elements. The reduction of such detrimental forces ensures that the centrality of the actuator pinion and valve stem is maintained so as to provide a highly accurate actuation of the ball valve via the actuator throughout a significantly increased lifetime of the valve and actuator.

The present invention also relates to a ball valve comprising a valve body defining a fluid passageway extending between a fluid inlet and a fluid outlet, two opposing ball seats located within the fluid passageway for rotatably retaining a ball in the valve body and a valve stem connected to the ball and extending through a valve stem bore in the valve wall to rotate the ball between the ball seats, and a valve stem seal comprising, an external O-ring having an inner diameter an outer diameter and an outer surface, a spring for axially compressing the external O-ring; and wherein the spring maintains a preload force on the external O-ring to ensure the inner diameter of the external O-ring remains in contact with the valve stem around its full circumference.

The present invention further relates to a method of connecting a ball valve to an actuator comprising the steps of providing a valve body defining a fluid passageway extending between a fluid inlet and a fluid outlet, locating a ball seat within the fluid passageway for rotatably retaining a ball in the valve body and extending a valve stem connected to the ball through a valve stem bore in the valve wall to rotate the ball in the ball seat according to an actuation force provided by an actuator, and forming the valve stem bore extending through a valve bonnet on the valve body and machining an external surface of the valve bonnet as a curved concave surface for receiving a mating connection mechanism of the actuator.

DETAILED DESCRIPTION OF THE PREFERRED EMBODIMENTS

Figure 1:
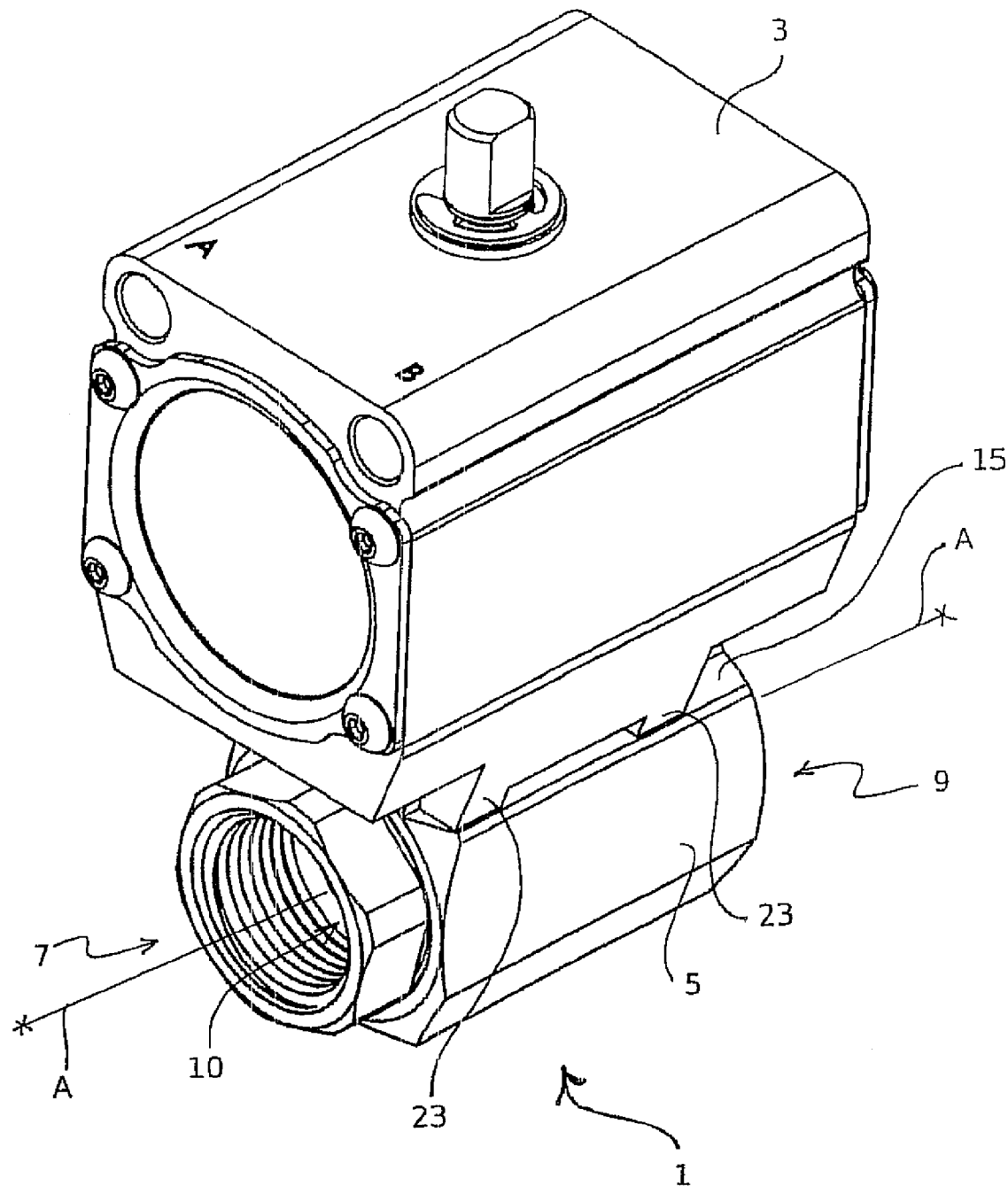
FIG. 1 is a perspective view of the ball valve 1 body and actuator 3.
Figure 2:
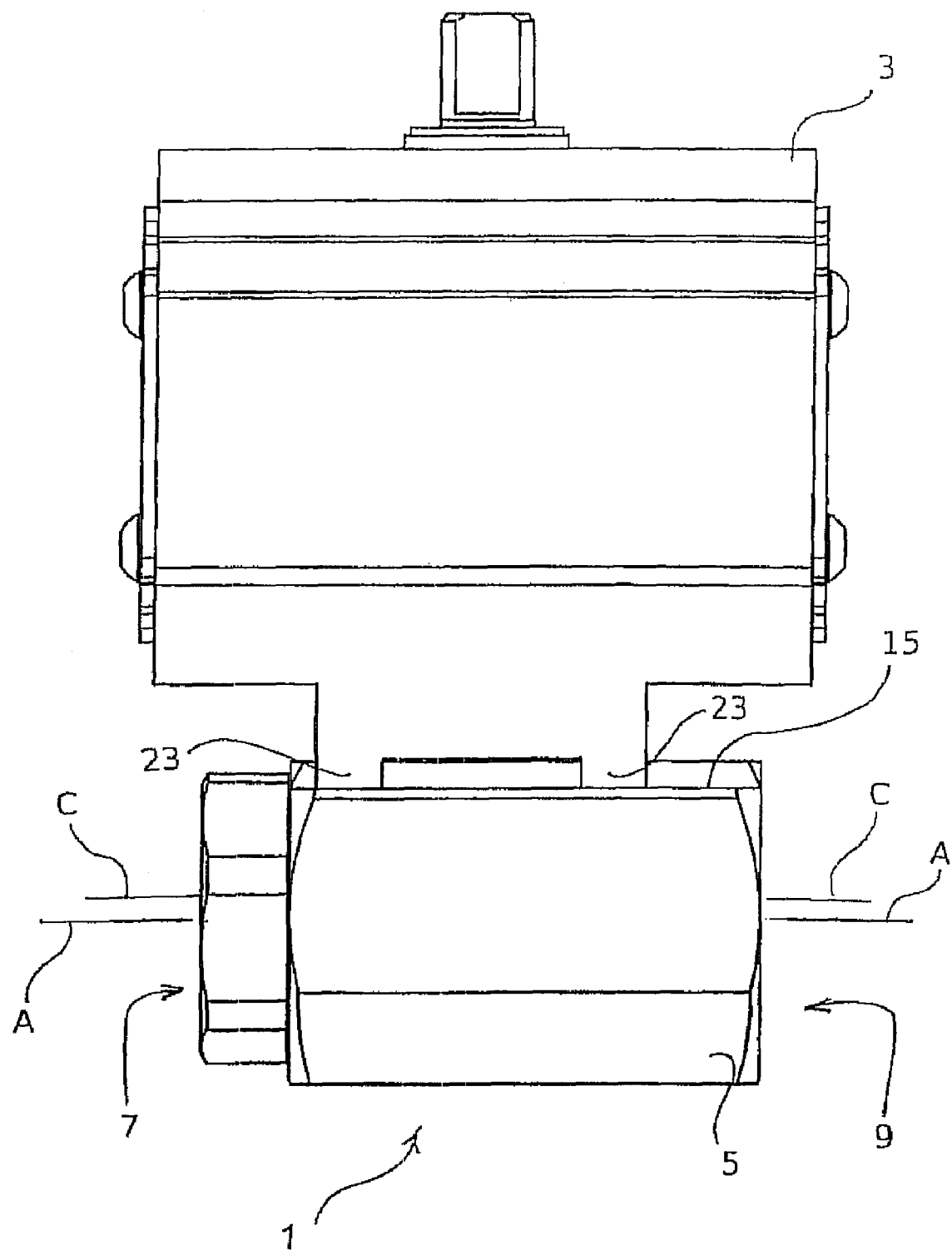
FIG. 2 is a side elevation view of the ball valve 1 and actuator 3 together.

Initially observing FIGS. 1-3 the present invention is embodied in a ball valve 1 connected to a ball valve actuator 3. The ball valve 1 is contained by a valve body 5 having an inlet 7 and an outlet 9 at opposing ends of the valve body 5 which define a passageway 10 therebetween along an axis A. As is well known, during use a fluid passes through the passageway 10 from the inlet 7 to the outlet 9 and the fluid flow is controlled by the orientation of the ball 6 inside the ball valve 1 which moves between an open position and a closed position to control the fluid flow through the passageway 10. The inner surface of the inlet 7 and outlet 9 is generally provided with a threaded connection in order to connect to the threads on an external surface of a pipe (not shown) connected to the inlet 7 and to the outlet 9 at either side of the valve body 5. As the general structure and operation of such ball valves 1 and fittings are well known in the art, no further discussion is provided with respect to the same.

The ball valve body 5 of the present invention is generally fabricated from bar stock for purposes of cost efficiency, although other methods of fabrication such as cast and molded valve bodies may also be used in this invention. The bar stock body may also have its axis A and hence passageway 10 as defined between the inlet 7 and outlet 9 formed eccentrically relative to the centerline C of the barstock, for example as described in U.S. Pat. No. 7,025,330 to Masse, and as shown in FIG. 2. The eccentric machining of the inlet 7 and outlet 9 of the ball valve 1 relative to the centerline C of the bar stock valve body 5 ensures that there is an abundance of material on one side of the bar stock valve body 5 than the other to facilitate the machining requirements for the valve bonnet 13 and the mounting track 15. The valve bonnet 13 and mounting track 15 are necessary for attaching and securing the valve body 5 and the actuator 3 together as described in detail below.

Figure 3A:
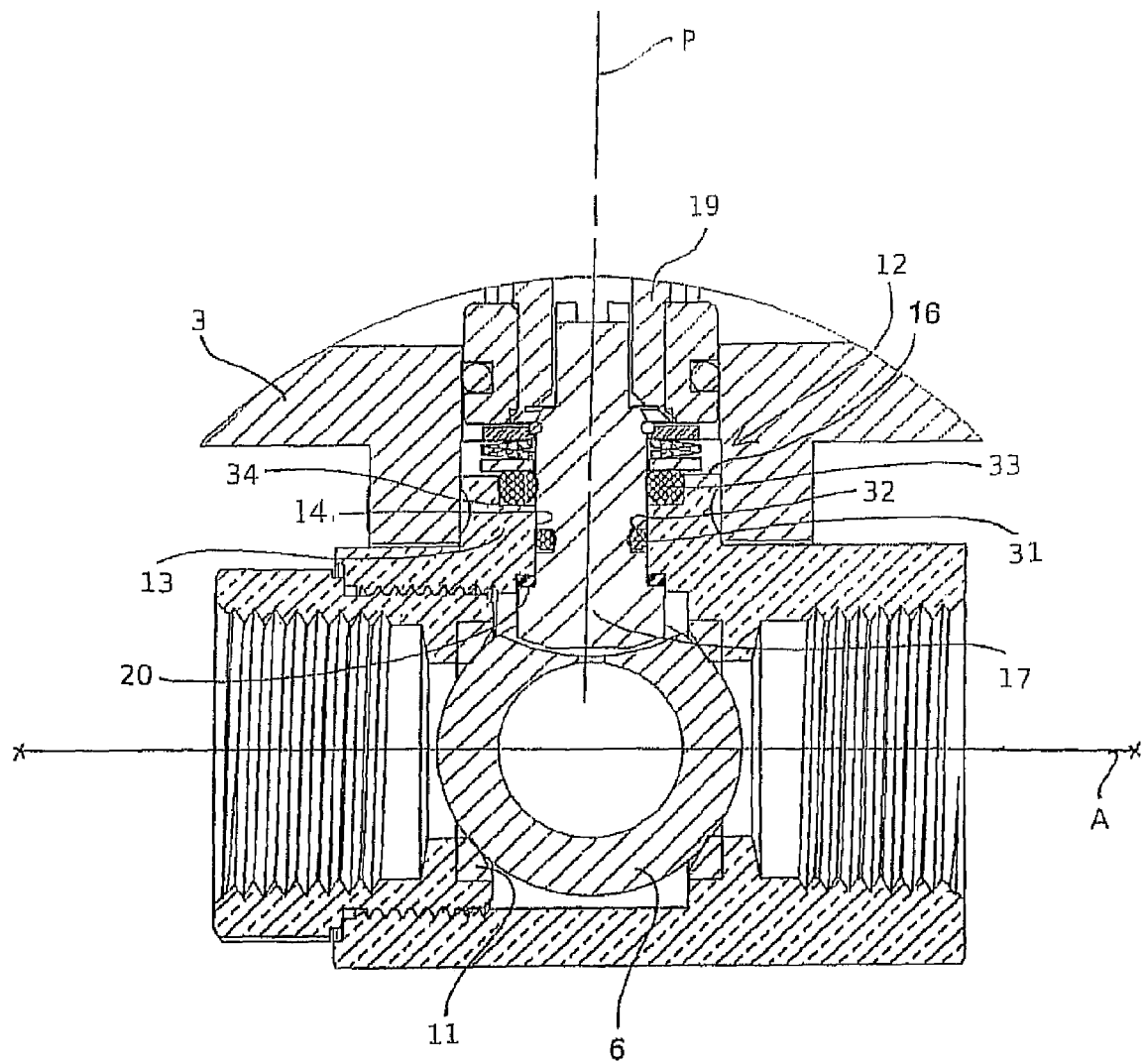
FIG. 3A is a cross-sectional view of the interior of the ball valve and the valve stem and stem seal mechanism attached to the actuator.

Turning to FIG. 3A, a cross-sectional view of the interior of the ball valve 1 shows the ball seat 11 supporting the ball 6 which controls the flow of fluid through the ball valve 1. A valve stem 17 is connected to the ball 6 and extends upwardly perpendicularly relative to the axis A upwards and through the valve bonnet 13 and into a connection with the pinion 19 of the valve actuator 3. A critical part of the present invention is that both alone, and working together, the valve stem seal 12 arrangement and mounting structure described in greater detail below maintain the valve stem 17 in perfect axial alignment, i.e., centrality, with the pinion 19 and the pinion axis P. The centrality is highly important because any axial misalignment or radial displacement between the pinion 19 and the valve stem 17 increases the torque and shear forces on the valve stem 17 and the valve stem seal 12 which can lead to premature leakage and failure of the ball valve 1 and actuator 3.

The valve stem seal components of the present invention provide improved integrity to the valve stem seal 12 by the use of a lower stem seal 20, an internal O-ring 31 and an external O-ring 33. The lower stem seal 20 is made of a durable material such as reinforced Teflon® and is positioned in a step formed on the lower most edge of the inner wall 14 of the valve bonnet 13 so as to form an initial static seal between the valve stem 17 and any fluid in the ball valve 1. Next, the valve stem 17 is provided at an intermediate location inside the valve bonnet 13 with a circumferential radial groove 32 into which the internal O-ring 31 is fit. The internal O-ring 31 is the main dynamic seal between the inner wall 14 of the valve bonnet 13 and the valve stem 17 for preventing fluid and pressure leakage from within the ball valve 1 up between the valve stem 17 and the inner wall 14 of the bonnet 13 especially in the circumstance where some axial misalignment of the valve stem 17 occurs. Another function of the internal O-ring 31 is to inhibit media-borne contamination from leaking up through the valve stem 17 and valve bonnet 13 and detrimentally affecting the spring compensated external O-ring 33 discussed below.

Figure 3B:
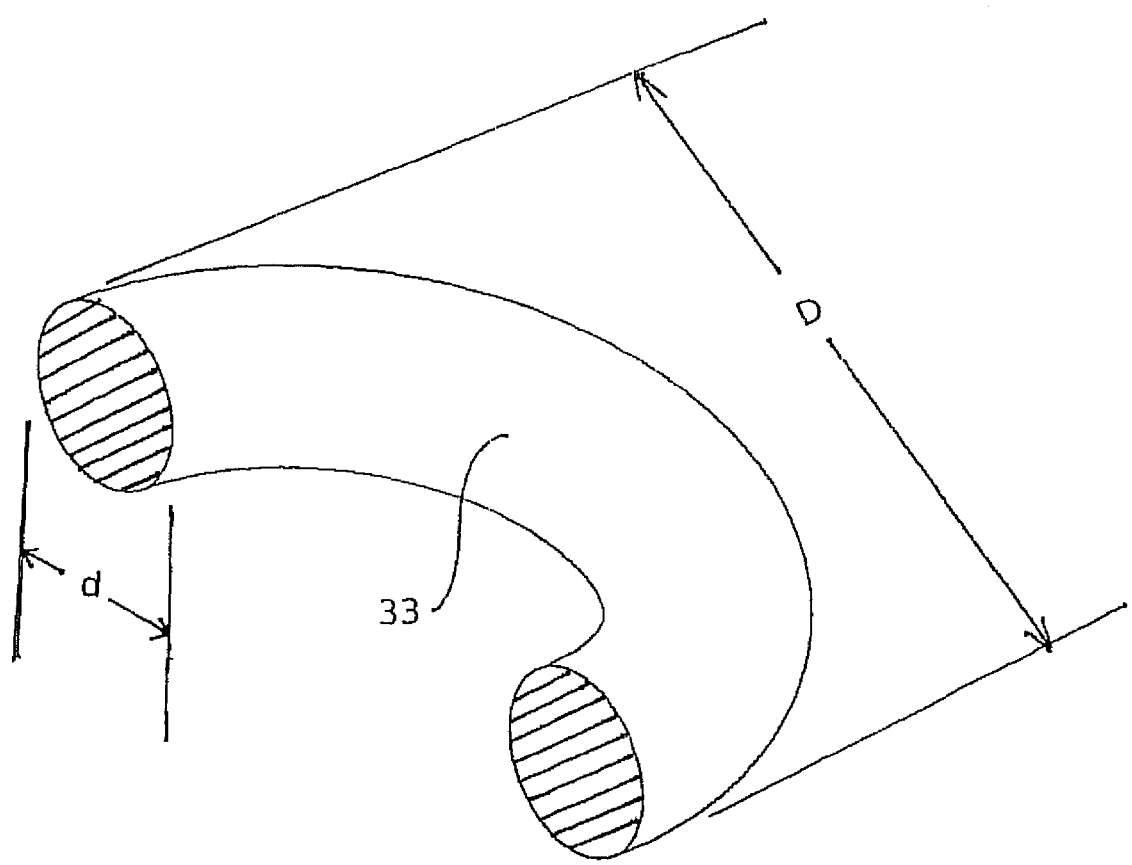
FIG. 3B is a cross-sectional side view of the external O-ring.

The external O-ring 33 provides both a secondary static and dynamic seal at the uppermost edge of the inner wall 14 of the valve bonnet 13 between the valve bonnet 13 and the valve stem 17. As a dynamic seal the external O-ring 33 prevents leakage when the valve is actuated, i.e., when the valve stem 17 is being rotated in the bonnet 13, and also as a static seal to prevent leakage when the valve stem 17 is stationary. An upper groove 34 is circumferentially formed in the topmost edge of the inner wall 14 of the valve bonnet 13 and the external O-ring 33 is fit into the upper groove 34. The external O-ring 33 is sized so as to have a cross-sectional diameter d and a radial diameter D which can be compressed into the upper groove 34 and elastically seals the entire radial distance between the bonnet and the valve stem 17. An important feature of this invention, the cross-sectional diameter d of the external O-ring 33 shown in FIG. 3B is also great enough to extend the upper most surface portion of the external O-ring 33 above a top surface 16 of the valve bonnet 13 and so provide a desired set off S of an O-ring follower 35 from the top surface 16 of the valve bonnet 13 as explained below.

Another important aspect of the present invention, the external O-ring 33 is biasly or spring compensated, i.e., held in position by an axially directed compression spring 37 to make up for extreme cycling and radial wear of this O-ring 33 as the valve stem 17 is turned or actuated over time. As can be appreciated, as the valve stem 17 is cycled over the lifetime of the valve, friction wears the inner most surface portion or inner diameter ("I.D."), of the external O-ring 33. As is well known in conventional valves, as the wear occurs on the I.D. of the external O-ring 33 the inner diameter of the external O-ring 33 is increased to a point where the I.D. as defined by the inner most surface portion of the O-ring no longer contacts or abuts the surface of the valve stem 17. This creates a radial gap between the external O-ring 33 and the valve stem 17 that significantly increases the chances of fluid leaking through this external O-ring seal 33. This is especially true in the case of highly pressurized fluid systems which maintain a high continuous pressure force on the seals and exploit any weakening of the seals towards failure. The axial bias or spring compensation force exerted on the external O-ring is intended to counteract the increasing I.D. by maintaining a biasing force on the top surface of the external O-ring 33 which compresses the flexible elastic material comprising the external O-ring 33 and maintains contact between the I.D. of the external O-ring and the valve stem 17.

Figure 4:
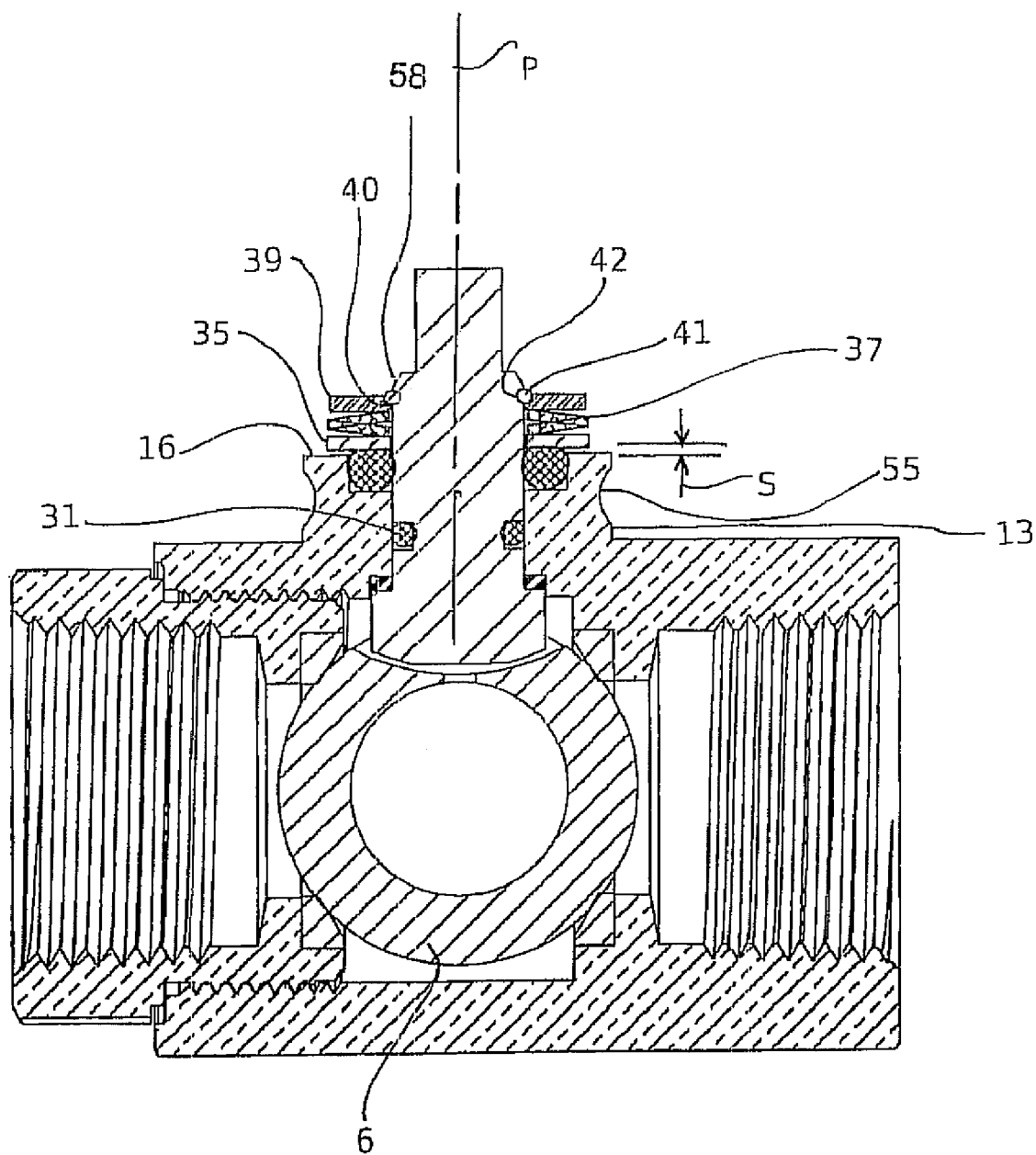
FIG. 4 is a cross-sectional side view of the valve body and stem seal components.

A biasing mechanism such as a compression spring, for example, a Belleville spring 37 is positioned axially adjacent, as shown in FIG. 4 and axially above, the external O-ring 33 seal to provide a downward axial force on the external O-ring 33. The biasing mechanism could also be an elastically deformable O-ring, was her(s), coil spring or other compressible biasing mechanism but by way of example the biasing mechanism is exemplified by the Belleville compression spring 37. The O-ring follower 35 is placed between the spring and the external O-ring 33 so that through the O-ring follower 35 the spring 37 places an axial force around the top exposed circumference of the external O-ring 33 and forces the elastically deformable O-ring to expand radially inwardly, i.e., so that any wear of the I.D. of the external O-ring 33 is compensated for by this radial inward expansion. The force applied by the spring 37 is directed to expand the O-ring 33 radially inwardly because the vertical and horizontal faces of the upper groove 34 confine the O-ring from expanding the outer diameter (O.D.) as the external O-ring 33 radially outward, or axially downwardly respectively. Thus, the Belleville spring 37, provides a constant axial pressure force on the external O-ring 33 so that as the inner radial surface of the external O-ring 33 wears, the entire inner radial surface I.D. of the O-ring 33 is maintained in contact with the circumferential outer surface of the valve stem 17 and so maintains the valve stem seal 12.

Due to the dimensions of the external O-ring 33 extending above the top surface 16 of the bonnet, the bottom surface of the O-ring follower 35 is spaced the desired set-off S from the top surface 16 of the valve bonnet 13. As the inner diameter of the external O-ring 33 wears and the Belleville spring 37 maintains a constant axial force or pressure on the O-ring follower 35 and hence the external O-ring 33, the top most surface of the external O-ring 33 is forced farther axially downward and maintains a decreasing set-off until the O-ring wears to the extent that the bottom surface of the O-ring follower 35 contacts the top surface 16 of the valve bonnet 13. The desired set-off S is generally based on the size of the valve and the external O-ring 33. In a large valve with a correspondingly larger external O-ring 33 the set-off S would of course be greater than in a smaller valve. It has been found that a preferred initial set-off of the O-ring follower is approximately 5-30% and more preferably about 10-20% of the diameter d of the O-ring 33. For example where the diameter of the O-ring is 0.139", 0.1×0.139=0.0139" would be an appropriate set-off S.

The constant axial force provided by the Belleville spring 37 is important because it maintains the same axial force on the O-ring 33 no matter to what extent the O-ring 33 wears and reduces the set-off S. At least until sometime after the O-ring follower 35 bottoms out on the top surface 16 of the bonnet 13, no manual intervention such as maintenance or tightening of a packing nut is necessary to maintain the seal. This provides a substantially longer lifetime to the external O-ring 33 and the seal provided thereby with the valve stem 17.

Figure 5:
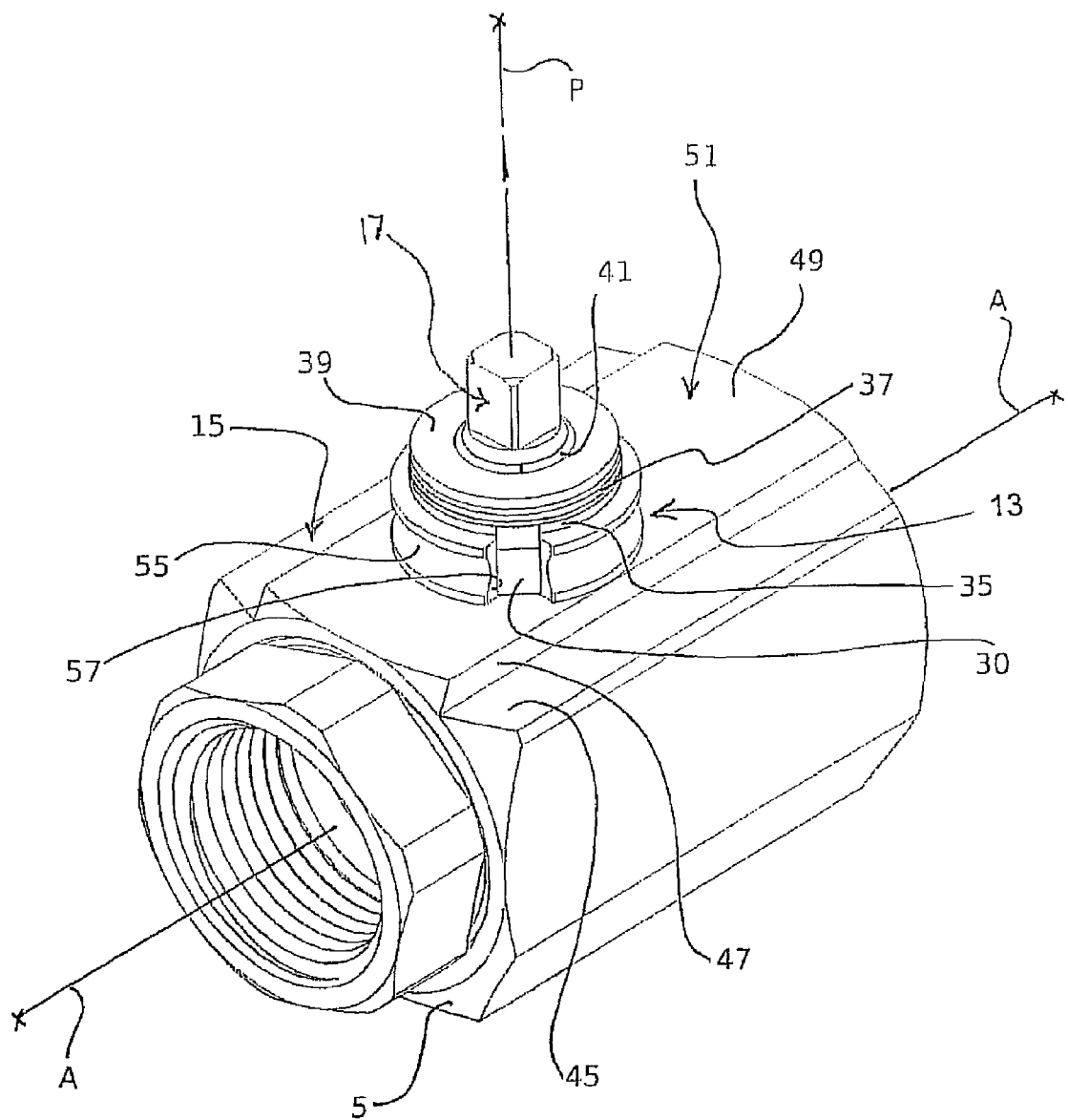
FIG. 5 is a perspective view of the valve body, valve bonnet and valve stem as well as the valve stem seal mechanism.

The O-ring follower 35 placed between the biasing mechanism or Belleville spring 37 and the external O-ring 33 also reduces the overall circumferential wear on the diameter d of the external O-ring 33 because the O-ring follower 35 is radially fixed, i.e., cannot rotate, because of a pair of axially downwardly depending legs 30 from the O-ring follower 35 which fit into detents 57 in the valve bonnet 13 which thereby maintains the O-ring follower 35 in a specifically aligned radial position as shown in FIG. 5. This directly prevents any axial wear on the external O-ring 33 caused by any circumferential rotational movement of the Belleville spring 37 relative to the external O-ring 33.

Returning to FIG. 4, on top of, or axially above the Belleville spring 37 is a spring follower 39 for securing the spring 37 or other biasing mechanism relative to the valve stem 17. The spring follower 39 is provided with a notch 40 on an innermost edge for partially receiving a retaining ring 41 for securing the follower to the valve stem 17. Once assembled, the notch 40 in the spring follower 39 also prohibits the retaining ring 41 from being removed or accidentally released from its secured position by confining the outer diameter of the retaining ring 41 and locking it into the retaining ring groove 42 machined into the valve stem. The retaining ring 41 is in turn secured in place inside a retaining groove 42, or alternatively under a circumferential lip 58, around the valve stem 17 itself. The retaining ring 41 may be for instance a snap or split ring which has a diameter smaller than the outer diameter of the valve stem 17 or smaller than the circumferential lip 58 and thus snaps into the retaining groove 42 or under the lip 58 on the valve stem 17. The Belleville spring 37 forces the spring follower 39 axially upwards against the retaining ring 41 in the retaining groove 42 so as to maintain the retaining ring 41 and the spring follower 39 substantially axially immovable relative to the valve stem 17.

The spring follower 39 in turn maintains the Belleville spring 37 in a compressed position between the spring follower 39 and the O-ring follower 35 so that the spring 37 can only expand axially downwardly towards the valve bonnet 13 and so force compression to maintain the I.D. of the external O-ring 33. With this arrangement, no conventional valve stem packing nut is necessary in order to maintain the stem seal components in relative connection on the valve stem 17. The valve stem seal 12 maintains its integrity without any adjustment or maintenance or any pre-load of the seal mechanism, the pre-load is in general fixed and dependent upon the retaining ring 41 and the size, type and spring constant of the spring 37 or other biasing mechanism utilized in the device. This structure further eliminates any danger of over, or under-tightening such as known with a packing nut which can result in premature stem seal leaks.

In another embodiment of the present invention disclosed in FIGS. 5-8, a unique mounting system for connecting the valve body 5 to the actuator 3 is shown and described. Observing FIG. 5, the valve body 5 as described above is generally machined from bar stock and is formed having the mounting track 15 consisting of two parallel tracks 15 machined across a top side 51 of the valve body 5 parallel to the axis A. These tracks 15 are essentially channels and form an area of low relief on each side of the valve bonnet 13 and which define therebetween an area of high relief on which the valve bonnet 13 is formed. The tracks 15 on either side of the bonnet 13 are each defined by a floor 45 extending along the length of the valve body 5 and an inner sidewall 47 leading upwards from the floor 45 to the top of the area of high relief 49. The inner sidewall 47 and floor 45 do not have to extend the length of the valve body 5, but for purposes of machining may be more economically formed in this manner.

The valve bonnet 13 is set, affixed or formed by machining atop the area of high relief 49 and provided with a radial, circumferentially extending bonnet channel 55 around and defining the outermost circumferential surface of the bonnet. The bonnet channel 55 has a curved, concave cross-section extending between a top and a bottom edge of the valve bonnet 13 and, as will be explained in further detail below, the bonnet channel 55 facilitates the secure axial retention of the valve body 5 against the actuator 3. Interrupting the outermost circumferential surface of the bonnet as well as the bonnet channel 55 are the pair of detents 57 previously described for receiving the legs 30 of the O-ring follower 35, although only one detent 57 and leg 30 may be necessary, two are discussed for purposes of clarity. As explained previously in regards to the valve stem seal 12, the detents 57 in the valve bonnet 13 receive the depending legs 30 from the external O-ring 33 follower to keep the external O-ring 33 follower from radially rotating. It is also important to note that these detents 57 are opposingly formed on either side of the valve bonnet 13 and are oriented essentially parallel with the axis P but at an approximately 45 degree angle relative to a plane defined by the axis A and axis P. This 45 degree offset ensures that the detents 57 and depending legs 30 do not interfere with the rest of the mounting structure as described below.

Figure 6:
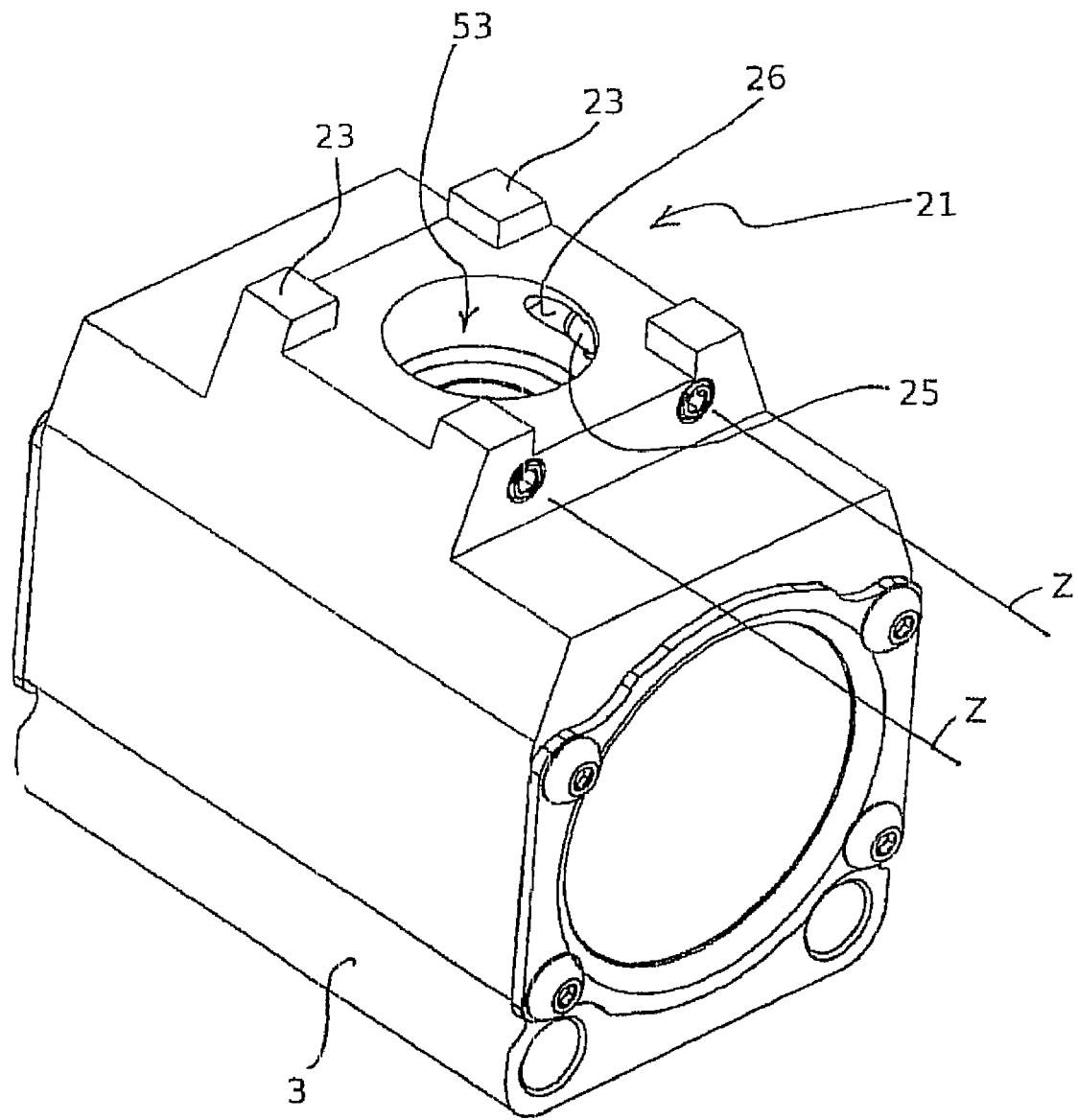
FIG. 6 is a perspective view of the mounting pad of the actuator.
Figure 7A:
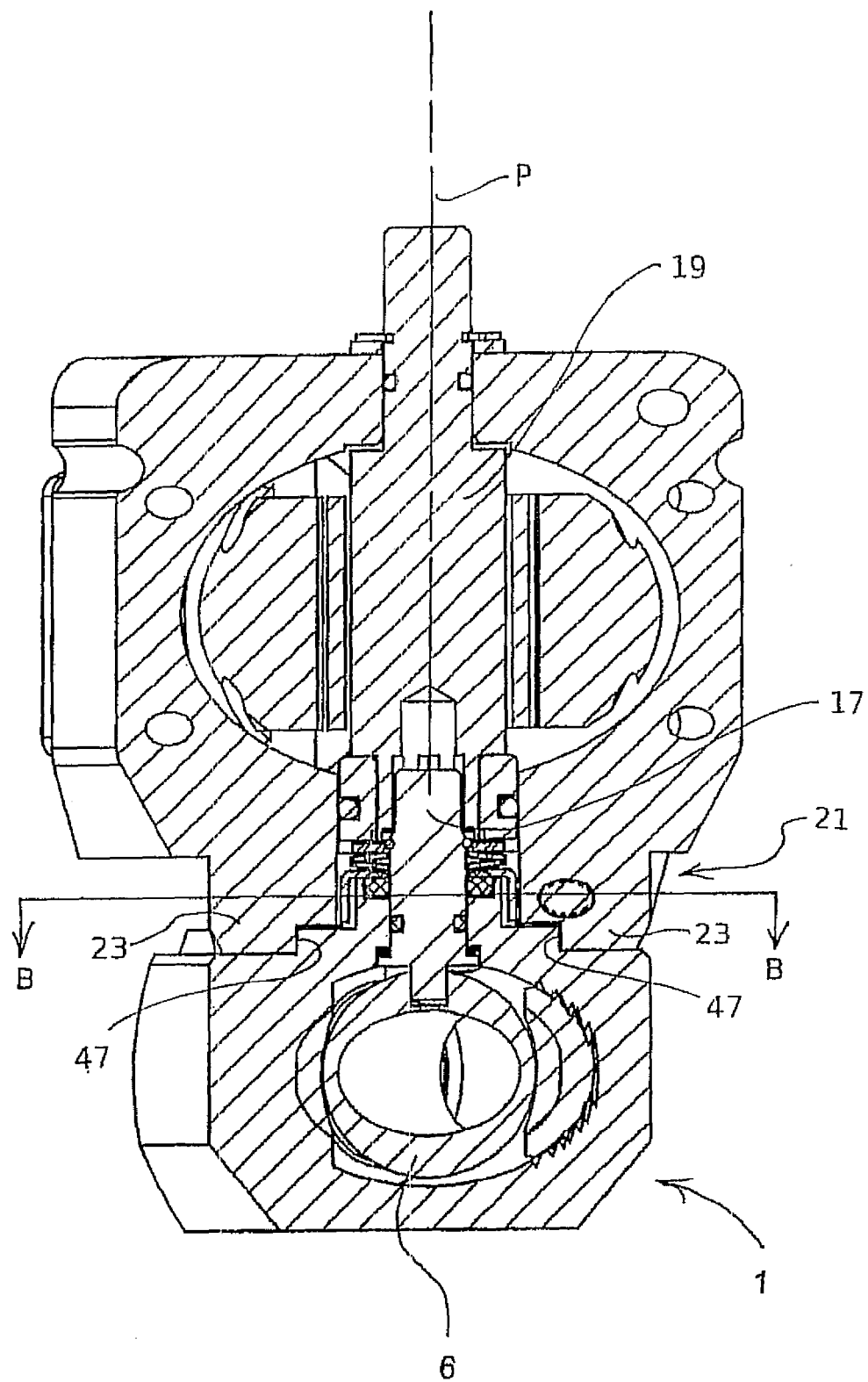
FIG. 7A is a partial cross-sectional view of the ball valve and seal mechanism.
Figure 7B:
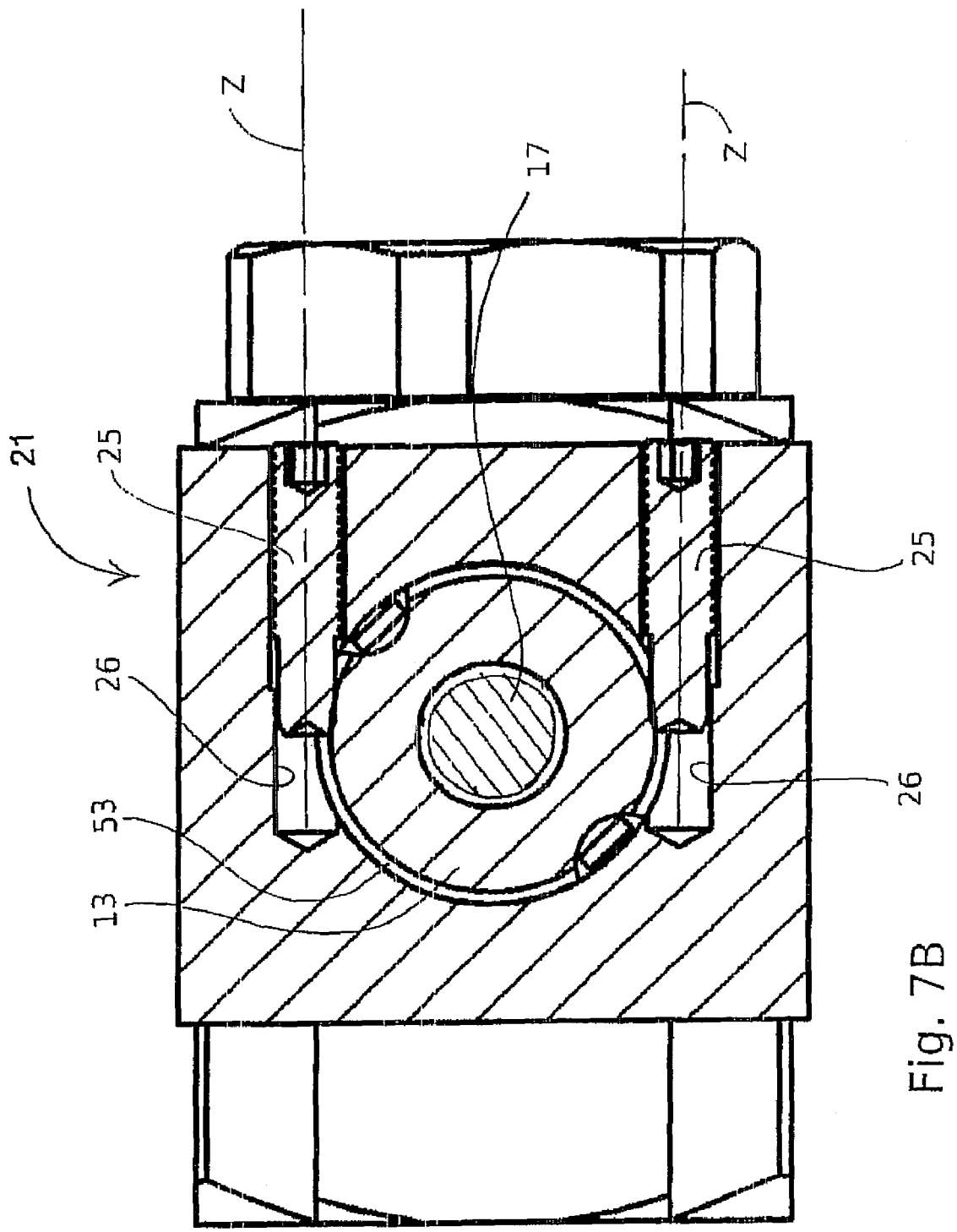
FIG. 7B is a cross-sectional view of the ball valve and seal system as connected with the actuator and mounting pad.
Figure 8:
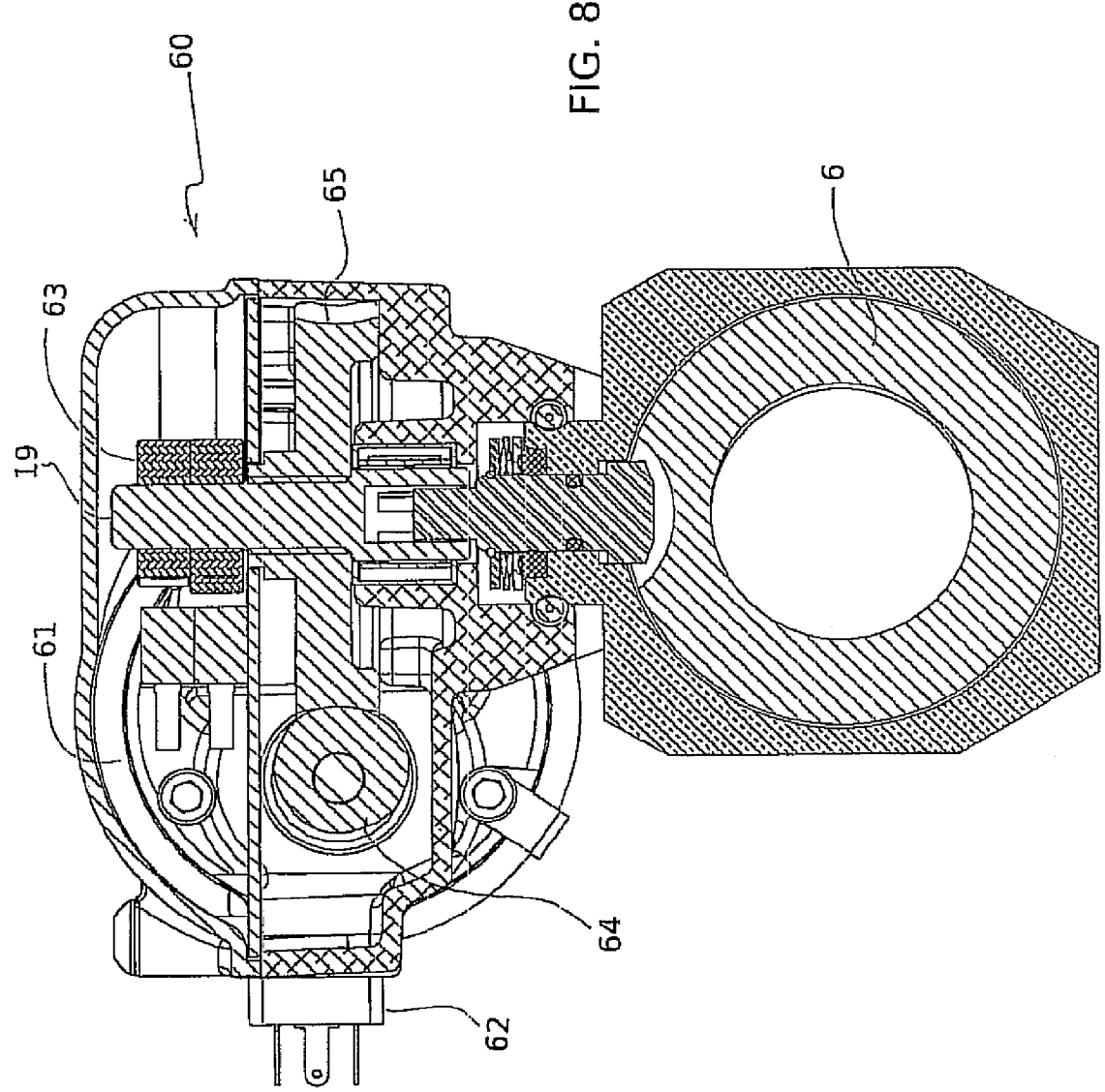
FIG. 8 is an elevational cross-section of the ball valve and seal system driven by an electric actuator and worm gear.

As shown in FIGS. 6-8, the actuator 3 is provided with a mounting pad 21 for integrally connecting with the top side 51 of the valve body 51 the valve bonnet 13 and hence the opposing tracks 15 formed in the top side 51 of the valve body 5. Observing FIG. 6, the mounting pad 21 includes a plurality of feet 23, in the case of the present embodiment four (4) feet 23 disposed in a square configuration, although other arrangements are possible, are used to engage the tracks 15 in the valve body 5 although another number of feet 23 could be used as well. The feet 23 which depend from the bottom of the mounting pad 21 define each corner of the square configuration and are spaced apart from one another the same distance as the width of the area of high relief 49 between the opposing tracks 15 on the valve body 5. In this manner, when the actuator 3 is connected with the valve body 5, two parallel adjacent feet 23 of the mounting pad 21 fit into and along each of the tracks 15 on the valve body 5 and the inner sidewall 47 of each channel bears directly on the side of the feet 23 and maintains the valve body 5 and the actuator 3 fixed in the desired relative radial positioning. With the four (4) feet 23 defining each corner of the mounting pad 21 as shown in the present embodiment, the valve body 5 may be mounted to the actuator 3 and vice versa in different radial positions, i.e., the radial alignment of the valve body 5 and the actuator 3 can be varied by 90 degrees so that a range of connection arrangements and alignments are possible.

With the valve body 5 brought into contact with the mounting pad 21 on the actuator 3 as in FIG. 7A, the valve seal 12 and valve bonnet 13 enter into a receiving orifice 53 centered between the four feet 23 of the mounting pad 21 and a portion of the valve stem 17 extends upwards above the bonnet 13 and into the actuator 3. The radial fit between the bonnet 13 and actuator orifice 53 is controlled such that only minimal clearance is allowed providing for precise centrality and axial alignment between the two elements. The tight control of the tolerances of the bonnet 13 and orifice 53 ensures that the valve stem 17 is in precise connection and axial alignment with the pinion 19 located inside of the actuator 3. The valve stem 17 and pinion 19 are non-rotatably connected together so when necessary they may rotate together about the valve stem 17 axis P to turn the ball 6 of the ball valve 1 to a desired position. Because the mounting pad 21 and feet 23 are engaged in the opposing tracks 15 on the valve body 5 no relative radial rotation of the actuator 3 and the valve body 5 can occur, only the matter of axially affixing and securing the valve body 5 and the actuator 3 remains.

The curved, concave cross-section defining the bonnet channel 55 on the outer circumferential surface of the valve bonnet 13 passes into the receiving orifice 53 and the bonnet channel 55 is brought into axial alignment with at least one, and preferably two horizontally extending clamp screws 25 rotatably supported in the mounting pad 21 of the actuator 3. As seen in FIG. 7B, each of the clamp screws 25 are provided through the mounting pad 21 in a receiving passage 26 along an axis Z perpendicular to the axial alignment of the valve stem 17 and pinion 19. The receiving passages 26 accepting the clamp screws 25 are spaced a desired distance on each side of the receiving orifice 53, however they are spaced so the receiving passages 26 at least partially intersect with, and an outer surface of the clamp screw 25 also intersects with and enters inside the radius of the opening defined by the receiving orifice 53. Because of this spacing and intersection, a portion of the outer surface of each clamp screw 25 comes into contact with and interferes with the curved, concave surface on the outer surface of the bonnet 13.

By way of further explanation, with the valve bonnet inserted inside the receiving orifice 53 of the mounting pad 21 as the clamp screws 25 are tightened, they extend farther into the receiving orifice 53 and due to the tangential nature of the alignment between the axes Z and the bonnet 13 the clamp screws 25 begin to engage tangentially with the curved, concave surface 55 of the bonnet 13. As the screws are turned farther into the receiving passages 26 and into greater contact with the bonnet channel 55, the curved, concave bonnet channel 55 by its very nature aligns and centers itself with the similarly curved outer circumference of the clamp screws 25. In other words the concave curve defining the bonnet channel 55 mates in a natural corresponding curved fashion with the clamp screw 25 and thereby pulls the valve body 5 into close integral contact with the actuator 3. The curved concave bonnet channel 55 and clamp screw 25 act as a cam means which when the clamp screws 25 extend tangentially into relative contact with the bonnet channel 55 pulls the bonnet and hence the valve body 5 axially vertically upwards and into even tighter, more direct contact, with the mounting pad 21 of the actuator 3. Thus, this clamp screw 25 and bonnet channel 55 arrangement ensures a relative and secure axial connection between the valve actuator 3 and the valve body 5.

In this structure and arrangement with the axial relationship between the actuator 3 and valve body 5 secured by the clamping screws 25, and the radial relationship confined by the mating feet 23 of the mounting pad and mounting track 15, any relative torque occurring between the actuator 3 and the valve body 5 is absorbed independently of the clamp screws 25 through the feet 23 on the four (4) corners of the mounting pad 21 that straddles the area of high relief 49 on the valve body 5. Such torque forces are essentially absorbed by the side of the feet 23 within the channel bearing against the respective opposing inner sidewalls of the opposing tracks 15 on the top side 51 of the valve body 5. The absorption of these torque forces by this integrated structure ensures that the torque forces are not transferred to the pinion 19 and valve stem 17 of the actuator 3 and ball valve 1. Thus, the centrality, or axial alignment of the pinion 19 and valve stem 17, as well as the connection therebetween, remains unaffected and secure, eliminating any risk of the valve loosening while in service.

Figure 9:
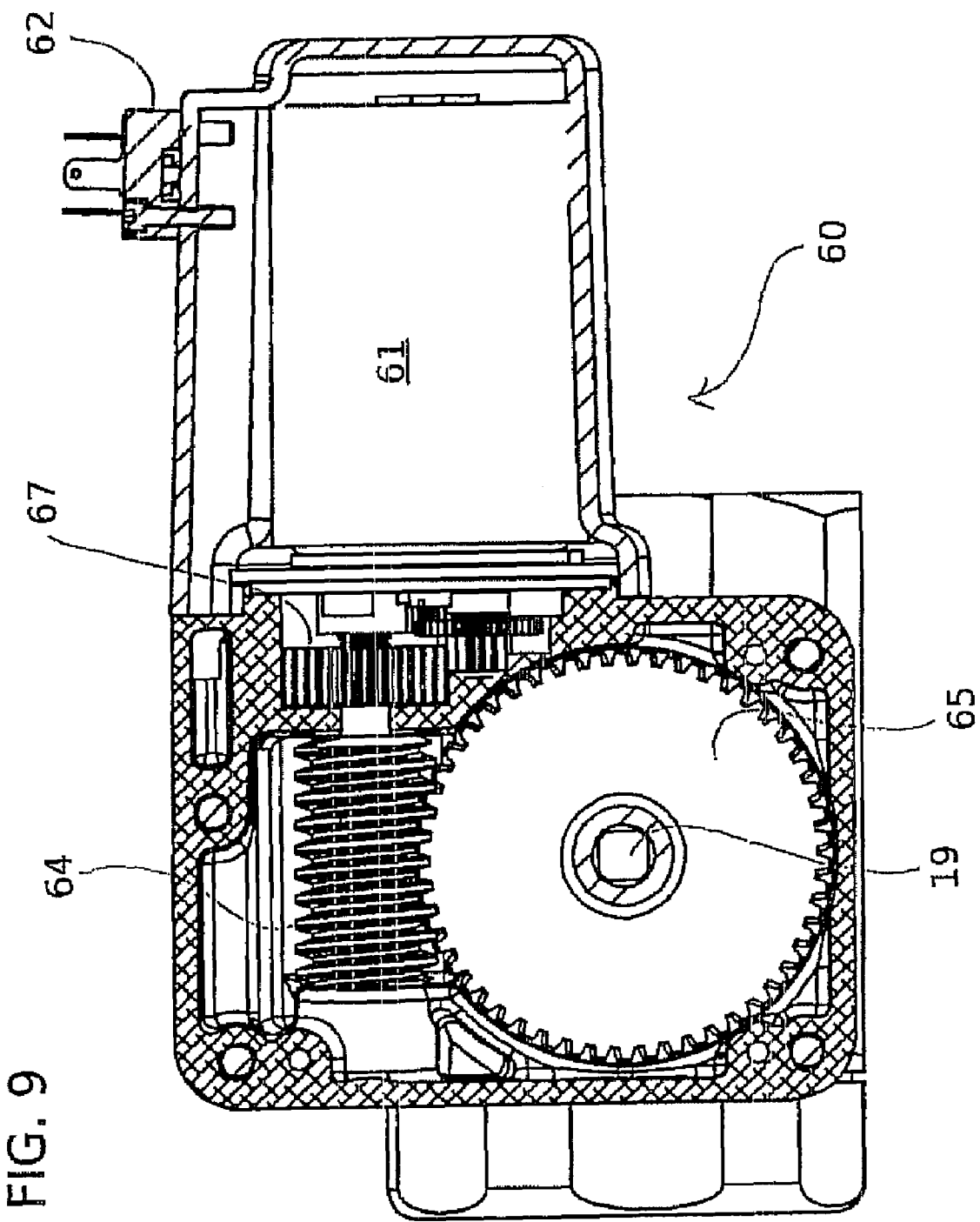
FIG. 9 transmission from the motor to the valve stem.

In a further embodiment of the present invention seen in FIGS. 8 and 9 the mounting system as described above facilitates use of the ball valve in conjunction with an electric drive motor for actuating the ball valve 1 instead of a hydraulic or pneumatic drive as previously discussed. The use of an electric motor driven actuator is preferred in certain cases where a pneumatic or hydraulic power source is not available, or where a smaller space requires a valve and actuator smaller than known electric actuators. It is to be appreciated that with the mounting and valve packing arrangement as described above, the torque from conventional valve necessary to actuate these ball valves, i.e., open and close the ball valves is significantly reduced. This torque reduction permits a significant reduction in the necessary size of the electric motor and permits a more compact arrangement of drive components for actuating the ball valve 1.

The electric actuator 60 of this embodiment includes a specific worm drive transmission arrangement which is an important aspect of the present invention resulting from the reduction in torque necessary to actuate the valve as described above. The smaller amount of necessary torque permits use of a smaller electric motor 61 and a more compact drive train arrangement with more space efficient components, i.e., a spur and worm gear to turn the ball valve can be utilized, thereby reducing the overall space and energy requirements for each respective sized ball valve.

The electric drive of this embodiment as seen in FIG. 8 includes the electric motor 61 having an electrical connection 62 for receiving power. In general, the motor 61 drives a reduction ratio transmission as shown. (Although other types of reduction transmissions are certainly possible.) Positional/rotation sensors 63 for indicating the relative position of actuator pinion 19 and hence the open and closed state of the ball valve 1 are located axially above the worm gear 65. Substantially different from the conventionally known electric actuators, the present actuator uses a 50:1 ratio reduction worm gear reduction ratio transmission including a worm 64 for driving the worm gear 65 which in turn rotates the actuator pinion 19 and the ball 6 of the ball valve 1.

The motor 61 produces an output drive which turns a series of spur gears 67 to drive the worm 64 as seen in FIG. 9. The worm 64 thus drives the main worm gear 65 which drives the actuator pinion 19 for rotating the ball valve 1. The worm 64 may not necessarily be the most efficient power transfer in a reduction ratio transmission, however worm gears have the additional advantage of being relatively compact. The reduction in torque necessary to actuate the ball valve 1 disclosed herein as facilitated by the new mounting connection between the valve and actuator makes it feasible to use the worm 64 with a smaller electric motor 61 then is generally used while still taking advantage of the compact size of the worm 64 to reduce the overall size of the actuator itself. This important aspect of the present invention thus has the goal of fabricating a relatively smaller drive and connection components for the necessary sized ball valve 1 which are not only more efficient in terms of power use, but can be fit into smaller more compact areas, products and processes.

Since certain changes may be made in the above described invention, without departing from the spirit and scope of the invention herein involved, it is intended that all of the subject matter of the above description or shown in the accompanying drawings shall be interpreted merely as examples illustrating the inventive concept herein and shall not be construed as limiting the invention.

We claim:

1. A ball valve comprising:
   a valve body defining a fluid passageway extending between a fluid inlet and a fluid outlet;
   a ball seat located within the fluid passageway for rotatably retaining a ball in the valve body and a valve stem connected to the ball and extending through a valve stem bore in the valve wall to rotate the ball in the ball seat; and
   a valve stem seal comprising;
      an external o-ring having an inner diameter an outer diameter and an outer surface;
      a spring for axially compressing the external o-ring; and
   wherein the spring maintains a preload force on the external o-ring to ensure the inner diameter of the external o-ring radially contacts the valve stem.

2. The ball valve as set forth is claim 1 wherein the outer surface of the external o-ring extends axially beyond a top surface of the valve bonnet.

3. The ball valve as set forth is claim 2 further comprising an axially movable o-ring follower positioned between the spring and the external o-ring and an axial set off is defined by a distance between the o-ring follower and the top surface of the valve bonnet.

4. The ball valve as set forth is claim 3 wherein the inner diameter of the external o-ring is effected by wear and the preload force influences the o-ring follower to reduce the axial set off and maintain the inner diameter of the external o-ring in contact with the valve stem.

5. The ball valve as set forth is claim 4 further comprising a threadless retaining member for securing the spring in relation to the valve stem wherein the spring is retained the desired preload on the valve stem between the retaining member and the o-ring follower.

6. The ball valve as set forth in claim 1 further comprising a valve bonnet connected to the valve body through which the valve stem bore extends and the valve bonnet is formed having a side surface wherein at least a portion of the side surface is formed as a curved concave surface.

7. The ball valve as set forth in claim 6 wherein the valve bonnet is provided with an upper surface and at least a portion of the external o-ring is exposed a desired distance above the upper surface.

8. The ball valve as set forth in claim 7 wherein the spring is maintained spaced from the upper surface of the valve bonnet by the exposed portion of the external o-ring.

9. The ball valve as set forth in claim 7 further comprising an o-ring follower positioned between the spring and the external o-ring and the exposed portion of the o-ring defines a spacing between the o-ring follower and the upper surface of the o-ring.

10. The ball valve as set forth in claim 6 wherein the valve body further comprises an upper surface above which the valve bonnet extends and an alignment surface formed below the upper surface to facilitate the connection and alignment of the ball valve with an automated ball valve actuator.

11. An automated ball valve comprising:
a valve body defining a fluid passageway extending between a fluid inlet and a fluid outlet;
a ball seat located within the fluid passageway for rotatably retaining a ball in the valve body and a valve stem connected to the ball and extending through a valve stem bore in the valve wall to rotate the ball in the ball seat according to an actuation force provided by an actuator; and
wherein the valve stem bore extends through a valve bonnet on the valve body and the valve bonnet is formed having a side surface wherein at least a portion of the side surface is formed as a curved concave surface for receiving a mating connection mechanism of the actuator.

12. The automated ball valve as set forth in claim 11 wherein the mating connection mechanism of the actuator comprises one of a bolt and a pin which engages the curved concave surface in the side surface of the valve bonnet to secure the ball valve body to the actuator.

13. The automated ball valve as set forth in claim 12 wherein the actuator further comprises a mounting pad having at least one of an integral protrusion and indentation for mating with one of a corresponding integral indentation and protrusion on the valve body to reduce torque forces between the actuator and the valve body.

14. The automated ball valve as set forth in claim 13 wherein the mounting pad and the at least one of an integral protrusion and indentation define at least a first alignment position between the valve body and the actuator and a second alignment position between the valve body and the actuator 90 degrees relative to the first alignment position.

15. The automated ball valve as set forth in claim 14 wherein the mating connection mechanism of the actuator provides a relative axial connection of the valve body and actuator and the mounting pad provides a relative radial rotational connection of the valve body to the actuator independent of the mating connection mechanism.

16. A method of connecting a ball valve to an actuator comprising:
providing a valve body defining a fluid passageway extending between a fluid inlet and a fluid outlet;
locating a ball seat within the fluid passageway for rotatably retaining a ball in the valve body and extending a valve stem connected to the ball through a valve stem bore in the valve wall to rotate the ball in the ball seat according to an actuation force provided by an actuator; and
forming the valve stem bore extending through a valve bonnet on the valve body and machining a side surface of the valve bonnet as a curved concave surface for receiving a mating connection mechanism of the actuator.

17. The method of connecting a ball valve to an actuator as set forth in claim 16 further comprising the step of engaging the curved concave surface in the side surface of the valve bonnet with one of a bolt and a pin of the mating connection mechanism to secure the ball valve body to the actuator.

18. The method of connecting a ball valve to an actuator as set forth in claim 17 further comprising the step of defining a mounting pad on the actuator forming at least one of an integral protrusion and indentation and mating the mounting pad with one of a corresponding integral indentation and protrusion on the valve body to reduce torque forces between the actuator and the valve body.

19. A ball valve and electric actuator comprising:
a valve body defining a fluid passageway extending between a fluid inlet and a fluid outlet;
a ball seat located within the fluid passageway for rotatably retaining a ball in the valve body and a valve stem connected to the ball and extending through a valve stem bore in the valve wall to rotate the ball in the ball seat; and
a valve stem seal comprising;
an external O-ring having an inner diameter, an outer diameter, and an outer surface;
a spring for axially compressing the external O-ring; and
wherein the spring maintains a preload force on the external O-ring to ensure the inner diameter of the external O-ring radially contacts the valve stem and the electric actuator rotates the valve stem and connected ball to open and close the valve.

20. The ball valve and electric actuator as set forth in claim 19 further comprising an electric motor and a transmission including a worm gear for transmitting rotational torque and power from the electric motor to the valve stem.

* * * * *